United States Patent [19]

Kiefer et al.

[11] 3,907,577

[45] Sept. 23, 1975

[54] MAKING SURFACE CRYSTALLIZED GLASS BODIES AND RESULTING PRODUCT

[75] Inventors: Dr. Werner Kiefer, Mainz-Mombach; Dr. Werner Sack, Mainz; Dr. Dieter Krause, Mainz-Mombach, all of Germany

[73] Assignee: Jenaer Glaswerk Schott & Gen., Germany

[22] Filed: Dec. 21, 1973

[21] Appl. No.: 427,137

[30] Foreign Application Priority Data

Dec. 23, 1972 Germany............................. 2263234

[52] U.S. Cl. .......................... 106/39.7; 65/30; 65/33
[51] Int. Cl.² ........................................... C03C 3/22
[58] Field of Search ................. 65/30, 33; 106/39.7; 161/192

[56] References Cited
UNITED STATES PATENTS

| | | | |
|---|---|---|---|
| 3,428,513 | 2/1969 | Denman............................ | 65/30 X |
| 3,490,984 | 1/1970 | Petticrew et al.................... | 65/30 X |
| 3,498,775 | 3/1970 | Simmons............................ | 65/30 X |
| 3,791,809 | 2/1974 | Lau.................................... | 65/30 |

*Primary Examiner*—Robert L. Lindsay, Jr.
*Attorney, Agent, or Firm*—Hill, Gross, Simpson, Van Santen, Steadman, Chiara & Simpson

[57] ABSTRACT

A process for the production of a high-strength translucent or opaque glass body which is resistant to temperature change and which has a partially crystalline surface layer and the product produced thereby. The glass comprises a β-spodumene and/or h-quartz solid solutions and a residual glass phase, and which differs in its oxidic composition from the basic glass by a higher $Li_2O$ content and correspondingly lower content of the other alkali oxides, the total mol content of the alkali oxides being however substantially the same. In the process, a heat treatment for the controlled surface crystallization is carried out on the glass, during which an ion exchange occurs within the glass between Li ions in the interior of the glass and Na- and/or K-ions on that side of the growing crystal front which is facing the interior of the glass.

17 Claims, 1 Drawing Figure

MAKING SURFACE CRYSTALLIZED GLASS BODIES AND RESULTING PRODUCT

BACKGROUND OF THE INVENTION

In general, the mechanical strength of a glass body may be increased by producing a compressive stress parallel to the surface thereof. One known process for achieving this effect involves, according to U.S. Pat. No. 2,779,136, immersion of a glass body which contains $Na_2O$ or $K_2O$ into a lithium salt melting-bath of low melting point so that an exchange takes place between the alkali ions of the glass and the molten salt. The lithium ions migrate or diffuse into the glass body in exchange with sodium or potassium ions from the glass. During the ion exchange, the glass body is kept at a temperature which is above its transformation temperature. The amount of exchanged lithium is equal to the molar equivalent of the sodium or potassium ions which are displaced by the lithium. Due to its lower thermal expansion coefficient, the surface layer comes under compressive stress during cooling of the resulting body upon removal from such bath.

According to U.S. Pat. No. 2,779,136 and W. Ger. Auslegeschrift 1,496,074, ion exchange can have the effect that lithium ions migrating from a lithium salt melt into a silicate glass body which contains alumina are able during the difffusion period to react under certain conditions with the glass and form very small $\beta$-spodumene or h-quarts solid solutions, which are dispersed in the glass matrix. As a result, the thermal expansion coefficient in the product glass bodie's surface layer, is considerably reduced, since $\beta$-spodumene and h-quartz solid solutions show small or even negative heat expansion coefficients.

According to W. Ger. Auslegeschrfit 1,239,817 crystalline surface layers having a low thermal expansion coefficient are produced by subjecting a glass body to a controlled heat treatment until h-quartz solid solutions are formed in the surface layers. In contrast to the previous process, no ion exchange occurs in this case, so that, during the surface crystallization, the oxidic composition of the surface layer is not changed and the crystalline surface layer and the core glass have the same oxidic composition.

BRIEF SUMMARY OF THE INVENTION

It has now been surprisingly discovered that, with alumosilicate glasses which contain lithium oxide and other alkali oxides in a molar ratio of $Li_2O/Al_2O_3$ which is not more than about 0.3, modifications occur in both the oxidic composition of the crystalline surface layer and of the core glass as a result of a controlled heat treatment for achieving surface crystallization without the glass body being so treated having come into contact with an external source of ions, as, for example, a lithium salt-melting or fusion-bath.

Although there is no wish to be bound herein by theory, such modifications of the oxidic composition in the crystalline surface layer and of the core glass apparently are attributable to an ion exchange with the glass body itself which comes into effect because glass in the produced surface-crystallized layer also contains sodium and/or potassium ions as well as lithium ions. The lithium ions are preferentially incorporated into the h-quartz solid solution phase of the surface crystals. Sodium or potassium ions cannot be incorporated into the crystal phase, but which, at the high temperature at which the surface crystallization proceeds, can be quickly exchanged with lithium ions from the interior of the glass body which, in their turn, are also then incorporated in the surface crystal phases.

It is thus an object of the present invention to provide an improved technique for preparing glass bodies having a crystalline surface portion.

Another object is to prepare aluminosilicate glasses in the form of bodies having crystallized surfaces so as to provide such bodies having improved strength characteristics.

Another object is to produce such bodies by a process involving internal ion exchange between surface and interior portions thereof using no ion transfer from outside the glass body itself.

Another object is to prepare glass bodies having a compressive stress in the surface layer thereof by internal ion exchange.

Other and further objects, purposes, advantages, aims, utilities, and features will be apparent to those skilled in the art from a reading of the present specification and drawings.

BRIEF DESCRIPTION OF THE DRAWINGS

In the drawing is shown a plot of a potassium microprobe section of a cross section of surface crystallized glass produced by the teaching of the present invention.

DETAILED DESCRIPTION

From investigations undertaken in connection with glassceramic glasses, it is known that, in the h-quartz solid solution, the $Li_2O$ may be partially replaced by $ZnO$ or $MgO$, so that it is possible to have the molar ratio $(Li_2O + MgO + ZnO): Al_2O_3$ be 1, instead of the molar ratio of $LI_2O : Al_2O_3$ being 1.

It has now additionally been discovered by us that, with glasses having a molar ratio $(Li_2O + MgO + ZnO): Al_2O_3$ which is 1, or which is either greater than 1 or smaller than 1, an internal ion exchange takes place in such a glass body between the lithium ions in the interior of the glass and the sodium and/or potassium ions on the growing crystal front in such glass body as long as the molar ratio of $Li_2O/Al_2O_3$ is smaller than 1. This observation can be interpreted as follows: The $Li_2O$ is preferentially incorporated into the h-quartz solid solutions by comparison with $ZnO$ and/or $MgO$. With the growth of surface crystals, it is, first of all, the lithium ions situated directly on the crystal front which are incorporated into the h-quartz solid solutions. In addition, the lithium ions from greater distances by diffusion reach the crystal front when other positive ions migrate to their initial locations for equalization of charge. The easily mobile alkali ions, $Na^+$ and $K^+$, are most suitable for this ion exchange within the glass. Divalent ions, such as, for example, $Ca^{2+}$ or $Ba^{2+}$, because of their low diffusion speed, are able to contribute only to a small extent to this internal ion exchange.

The $ZnO$ and $MgO$, likewise present in the glass, are partially incorporated, and then only in those places in the crystal lattice which remain after this internal ion exchange. The excess zinc and magnesium, like the residual glass elements not incorporated into the h-quartz, are disposed in the residual glass phase between the individual crystals and also to a small extent in the interior of the glass body immediately before the crystal front.

Figure 1:
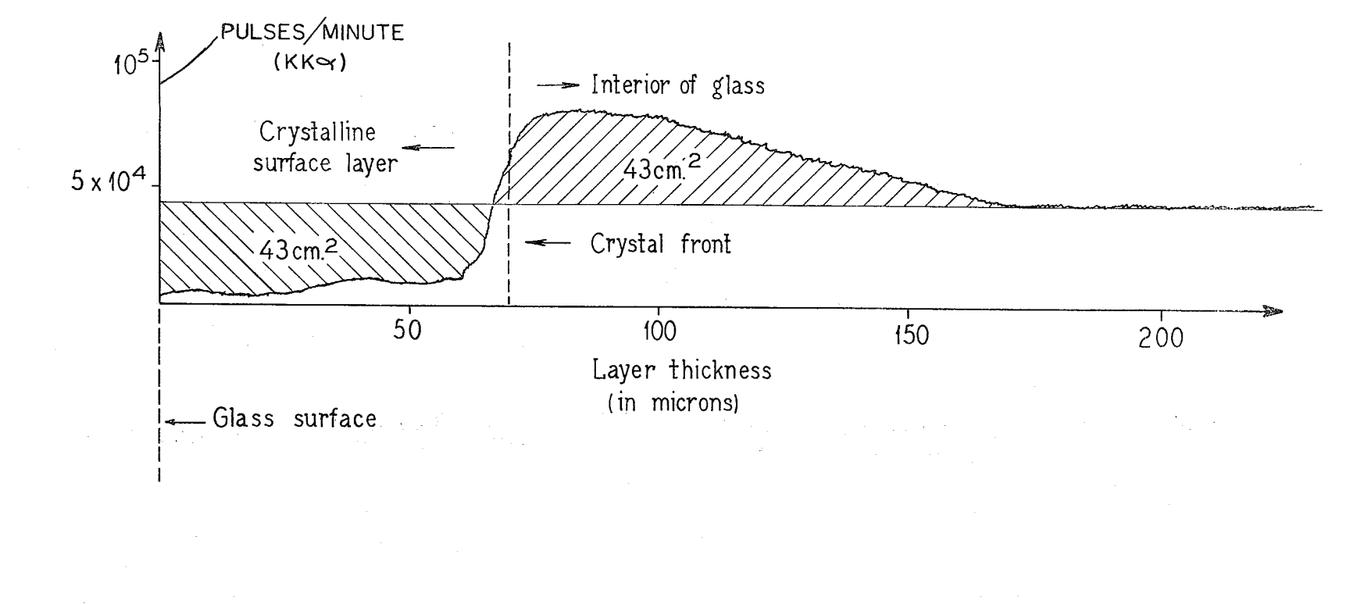

The fact that an ion exchange in the interior of the glass occurs between lithium, on the one hand, and sodium and/or potassium, on the other hand, is provable by means of a micro-probe. FIG. I shows a typical potassium micro-probe section, which is recorded on a cross-section of a sample section of the surface-crystallized glass of Example 6 (see Table III). Thus, while the potassium content in the surface crystalline layer is practically zero, there is disposed before the crystal front an increased potassium concentration with distance, which concentration decreases slowly into the interior of the glass until it has reached the original value of the intial glass. The excess quantity of potassium ions in the glass interior corresponds to the deficient quantity of potassium ions in the crystalline surface layer, which presumably results from the similarity of the surfaces.

Sodium behaves in a similar manner to potassium, except that it is distributed more quickly over the entire interior of the glass, presumably because of its higher diffusion speed, and it does not develop any increased sodium concentration at the crystal front.

In a manner similar to the alkali ions, the alkaline earth ions also basically participate in an ion exchange with lithium. Their diffusion speed is, however, substantially less, so that they are only able to contribute to a very small degree to the increase in the lithium content in the crystalline layer.

The process of this invention and the resulting product so produced provide important advantages as compared with prior art processes. Thus, as compared with the process in accordance with above referenced U.S. Pat. No. 2,779,136, with which there is an enrichment of lithium in the surface layer by treating a glass body in a lithium salt-melting or fusion-bath above the glass transformation temperature, it is possible to dispense with the use of the dangerous salt-fusion-baths which are difficult to handle and which are a prerequisite for the establishment of a crystalline surface layer by such process. Similarly, as compared to the process of West Germany Auslegschrift 1,239,817, by which there is only carried out at heat treatment for the surface crystallization, the present invention provides an advantage in that there is an internal ion exchange simultaneously with the surface crystallization. By this internal ion exchange, in accordance with the process of the invention, it is possible and practical to replace a part of the $Li_2O$ content in the basic glass by $Na_2O$ and/or $K_2O$ without any substantial deletrious effect on the speed of crystal growth in the lower crystallization range ($T_g$ up to a temperature at least about 200° above $T_g$) thereby either decreasing the crystal phase content in the crystalline surface layer or reducing the amount of $Li_2O$ in such crystal phase.

A high speed of crystal growth is generally preferred and is even required in the lower crystallization range, so as to produce a sufficiently thick crystal layer at lowest possible temperatures and thus to avoid a glass body deformation during the crystallization.

The crystal content, and, particularly, the amount of $Li_2O$ in the crystal phase, substantially establish the thermal expansion coefficent of the product crystalline surface layer. An increase in the $Li_2O$ content in the crystal phase leads to a lowering of the thermal expansion coefficient.

While it is desirable, for the reasons mentioned above, to have a highest possible $Li_2O$ content in the crystalline surface layer, the basic glass used in a starting surface-crystallizable glass body should preferably have a lowest possible $Li_2O$ content for the reasons as set out below. The glasses having a high $Li_2O$ content and a capability of being crystallized on their surfaces devitrify spontaneously at the transistion from the melt into the vitreous state at such low viscosities that a series of fabrication methods for the production of glass articles, as for example automatic pressing, blowing and drawing, can only be carried out with great difficulty, or, in fact, not at all. By a part of the $Li_2O$ content in the basic being replaced by $Na_2O$ and/or $K_2O$, the workability of the surface-crystallizble glasses is considerably improved, since, at the same time, such a replacement causes the viscosity curve to shift to somewhat higher temperatures and the upper devitrification limit to shift to considerably lower temperatures. Other advantages of a smaller $Li_2O$ content include a desired substantially lesser degree of action on the refractory materials of the tank, and a desired reduction in the cost of producing the batches.

The glasses which crystallize on their surfaces in accordance with the teachings of the present invention, and as a consequence a characteristic generic of which build up a desired compressive stress in the surface layer, have composition (in terms of 100 percent by weight for an individual composition as follows:

Table I

| Component | Wt. %* | |
|---|---|---|
| $SiO_2$ | about | 52 to 70% |
| $Al_2O_3$ | " | 10 – 25% |
| $B_2O_3$ | " | 0 – 8% |
| $P_2O_5$ | " | 0 – 10% |
| $Li_2O$ | " | 1 – 4% |
| $Na_2O$ | " | 0 – 8% |
| $K_2O$ | " | 0 – 10% |
| MgO | " | 0 – 5% |
| ZnO | " | 0 – 7% |
| CaO | " | 0 – 10% |
| BaO | " | 0 – 12% |
| $TiO_2$ | " | 0 – 1.2% |
| $ZrO_2$ | " | 0 – 2.5% |

*100 weight percent total weight basis.

In any given glass having a composition as defined in Table I, the weight of $LI_2O/Al_2O_3$ is not greater than about 0.3, the sum of $TiO_2$ plus $ZrO_2$ is not to exceed about 2.5 wt %, and the sum of $Na_2O + K_2O$ is in the range from about 1 to 10 wt %.

Optionally, from about 0.5 to 1 wt % of $As_2O_3$ may be added to a given composition as a refining agent. Also, other compatible components known to the art, including coloring oxides, such as for examples, $Fe_2O_3$, NiO, CoO, $Cr_2O_3$, can be included optionally in a given composition up to about 10% by weight thereof.

All glasses according to the invention are capable of being melted below temperatures in the range about 1,600°to 1,620°C. with very good quality.

A number of characteristic properties for glass bodies made by this invention are set out in Table III parts a and b to further explain and illustrate the invention.

The linear coefficient of thermal expansion is determined from the basic (starting) glass for the temperature range from about 20° to 300°C. The compressive stress which is produced in a crystalline surface layer in a glass body produced by this invention is greater as the difference of the linear thermal expansion coefficient between the crystalline surface layer and the basic glass is greater. Particularly, with thin glass speciments having a thickness of from about 1 to 3 mm, this difference in a value should not however be too great, since otherwise the glass specimens crack from the inside because of the high tensile stress in the interior of the glass.

The processing point $V_A$ is the temperature in °C at which the glass has a viscosity of $10^4$ poises. The $V_A$-point should lie at lowest possible temperatures and should not exceed about 1300°C, since at such an upper temperature the glasses can then still be worked only with difficulty.

An excellent aid as regards investigating devitrification processes is differential thermoanalysis (DTA). With the assistance thereof, it is possible very accurately to determine the temperature position of reactions which proceed endothermally. In the present case, an exothermal peak occurs with surface crystallization, and an endothermal peak occurs with redissolving of the crystals, the latter being termed the upper devitrification limit (UDL).

With the surface-crystallizing glasses, the temperature position of the exothermal peak is not only dependent upon the heat-up speed, but also upon the grain size of the specimen being investigated, since the amount of crystal formed per unit of time is also a function of the surface. With glasses having equal activation energy of crystal growth and under constant test conditions (heating-up speed: about 3°/min; grain size: about 40 to 60 um), the DTA peaks always occur with the same crystal growth speed (about 100 um/h). With DTA peak temperatures which are indicated in Table III, a crystalline surface layer having a thickness of about 100 $\mu$m is consequently developed with a heat treatment lasting about one hour.

In order that the deformation of glass bodies is kept low at the time of surface crystallization, the temperature difference (DTA - Tg) between the position of DTA peak and the transformation point is preferably as small as possible.

The upper devitrification limit (UDL) represents the upper limiting temperaure at which the first crystals are able to be formed on the surface when a glass body processed according to this invention is removed from the melt to cool. Conversely, with a heating-up process, the crystals formed at lower temperatures are once again dissolved at the UDL, as is shown by the endothermal peak with differential thermoanalysis.

As already mentioned, the resistance to devitrification of a melt is an important factor for its workability by hand or automatic machines. The resistance to devitrification is essentially determined by the temperatue difference between the working or processing point $V_A$ and the upper devitrification limit (UDL). The temperature difference ($V_A$ - UDL) should preferably be as large as possible, but in no case should it be negative, since otherwise a working or processing becomes very much more difficult or even impossible.

For measuring strength, round disc with a diameter of 45 mm and a thickness of 1.5 mm are made and a crystalline surface with a thickness of about 100 $\mu$m is produced by heat treatment, using the processes as claimed. These surface-crystallized round discs are abraded for 10 minutes with an emery cloth (grain 180) under a pressure of 1 kg. In this way, uniform surface defects are produced. In order to determine the resistance to flexural tension, each round disc which has been abraded is laid on a ring with a diameter of 40 mm and loaded in the centre. The load is slowly increased at 2 kg/min until the disc shatters.

The $Li_2O$ content of the glasses used in this invention should not be below about 1%, since otherwise the DTA temperature and the temperature difference DTA-Tg are very strongly increased and as a result there is a strong deformation of the glass body during the heat treatment thereof for surface crystallization. In addition, these low $Li_2O$ content glasses partially shrink very strongly with surface crystallization, or subsequent cooling, and as a result have an undesirable undulatory surface. With an $LI_2O$ content below about 1%, the crystal phase content in the crystalline surface layer and the amount of $Li_2O$ in the crystal phase are each also too small in order to produce, for a high compressive stress, a sufficient lowering of the heat expansion of the surface layer in relation to the basic glass.

An $Li_2O$ content of more than about 4 weight % in a given starting basic glass should be avoided, for reasons of cost. The lithium-alumosilicate glasses start characteristically to vitrify at viscosities which are as much lower as the $Li_2O$ content is higher. With $Li_2O$ contents above about 4 weight %, the temperatures of the upper devitrification limit rise above the $V_A$ temperature, whereby subsequent subjection of the product glass to an automatic blow-and-press manufacturing procedure is made very difficult or impossible. Because of the great mobility, the $Li_2O$ has a very strong attacking action on the tanks. For this reason also, the $Li_2O$ content should not exceed about 4 weight %.

The content of $Al_2O_3$ should not drop below about 10 weight % in a given glass since, otherwise, in a similar manner as with the $Li_2O$, the amount of crystal phase in the crystalline surface layer becomes too low to cause a sufficient lowering of the linear thermal expansion coefficient of a crystalline surface layer.

With increasing $Al_2O_3$ content, the UDL temperature is raised more quickly than the $V_A$ temperature. As a result, the temperature difference ($V_A$ - UDL) becomes smaller, even in order to assume a negative value with an $Al_2O_3$ content of more that about 25% by weight, and the this makes working of the product such glass very difficult or even impossible.

It is not possible to establish any positive influence of $B_2O_3$ on the crystal growth. The $B_2O_3$ content should not exceed about 8 weight % by weight in any given glass since otherwise the crystal growth therein is too strongly inhibited, and as a consequence the mechanical strength of the surface-crystallizing glass made therewith is lowered.

The $Na_2O$ content and/or the $K_2O$ content should not lie below about 1 weight % by weight in a given glass, since, by increasing the $Na_2O$ and the $K_2O$ content, both the devitrification behavior ($V_A$ - UDL) is improved by the strong lowering of the UDL, and the crystal growth speed in the lower temperature range, the crystal phase content in the crystalline surface layer and the amount of $Li_2O$ in the crystal phase being increased by the internal ion exchange with the $Li_2O$ from the interior of the glass.

The content of $Na_2O$ or $K_2O$, respectively, should not be above about 8 and 10 weight %, respectively, in a given glass and the sum of $Na_2O$ plus $K_2O$ should not be above about 10 weight % in a given glass, since otherwise, due to the too great heat expansion difference between the crystalline surface layer and the core glass in the interior of the glass body, such high tensile stresses are set up, that such can lead to a decrease in the mechanical strength, or even to a spontaneous disintegration of the glass specimens.

ZnO and MgO can be incorporated instead of $Li_2O$ into the H-quartz solid solution lattice, whereby both the crystal growth speed and the difference of the heat expansion coefficient between the crystalline surface layer and the basic glass are reduced.

It is apparently not possible to establish any influence on the nucleus formation at the surface or on the crystallization speed by $TiO_2$ and $ZrO_2$ which are present in the glass.

The content of $TiO_2$ should not exceed about 1.2% by weight in a given glass and the content of $ZrO_2$ should not exceed about 2.5% by weight in a given glass, and the sum of both should not exceed about 2.5% by weight in a given glass since both are able to act as nucleus formers, and, consequently, there is the danger of a volume crystallization, or of a development of individual crystals in the interior of the glass. The individual crystals in a glass interior because of their different expansion, characteristically build up a stress or tension field around them, which is superimposed in the glass interior on the tensile stress which is set up by the surface crystallization and can lead to destruction from the interior of the glass.

For modifying the properties, other metal oxides, such as, for example, CaO and BaO, can be added to the starting basic glass. Since these oxides can neither be incorporated into the h-quartz solid solutions, nor can they have, because of their high charge, a sufficiently high diffusion speed for migrating into the interior of the glass, they are deposited in the crystalline surface layer between the crystals. The CaO content should not exceed about 10 weight % in a given glass since the CaO certainly lowers the $V_A$ temperature, but not the UDL temperature, whereby there is a deterioration in the devitrification behaviour ($V_A$ - UDL). Since the BaO, because of its low diffusion speed, inhibits the crystal growth, not more than about 12 % by weight thereof should be included in a given glass.

With most of the prior known processes for surface crystallization, the crystal growth starts on the surface of the glass and the crystals grow from the surface vertically inwards in the form of long, parallel, forwardly pointed needles. From the closed crystal front, the separate crystal points project into the interior of the glass, in order to build up around them high peak values in the tensile stress, which quickly drop towards the glass interior to a constant value. These high tensile stress at the tips of the crystals can lead to fissures and thus to the cracking off of mixed crystals. Compared to the hitherto known usual processes, the volume which is under high tensile stress is reduced, permitting as many crystals as possible to grow. In this case, the number of the critical points certainly increases, but simultaneously, in the ambient region, the tension assumes non-critical values over a substantially shorter distance, so that the first effect is over-compensated for. By this means, the probability of crack or fissure formation is reduced to the same degree.

The high number of thin crystals is produced by keeping the glass body being processed as long as possible at low temperatures for the nucleus formation on the surface, or for nucleus formers to be applied to the surface.

A better procedure for reducing the high tensile stress is by avoiding the unfavorable geometry. It has now been found that in the presence of $P_2O_5$ in starting glasses as described above, at least strongly rounded crystal tips and usually even completely smooth crystal fronts are established, which tips are substantially completely free from additional tension or stress peaks.

This discovery means a considerable technical advance, in this art, since it thereby becomes possible for the glass bodies undergoing surface crystallization to be brought quickly to temperatures of high crystal growth speed without previously having to apply to surfaces thereof a nucleus former for nucleus formation or without having to carry out a preliminary tempering at relatively low temperatures.

The $P_2O_5$ content of a given starting glass body should not exceed about 10 weight %, since otherwise the mechanical strength of the product surface-crystallized glass body therefrom is considerably reduced. On the other hand, $P_2O_5$ provides the capability of producing opaque basic glasses which are sometimes desired.

Glasses within a composition range as set forth in Table I characteristically are either clearly transparent, or white and opaque in the basic glasses.

The clouding in a basic glass used in this invention is produced by addition of calcium-phosphate and/or barium phosphate.

Clear, transparent basic glasses, corresponding to the compositional range of Table I, and the conditions of $Li_2O/Al_2O_3$ 0.3; $TiO_2+ZrO_2$ 2.5 and $Na_2O +K_2O$ 1% and 10 %, which form a crystalline surface in accordance with the process of this invention with internal ion exchange, must have either a $P_2O_5$ content of less than about 2 weight % in a given glass, or a CaO content of more than about 1 weight % in a given glass and a BaO content of less than about 5 weight % in a given glass, or an $Al_2O_3$ content of more than about 20 weight % in a given glass.

Examples of clearly transparent glasses and their characteristic properties, which show a higher mechanical strength as a result of surface crystallization by the process of this invention are included in Tables IIa and IIIa below.

After surface crystallization, the clear, transparent basic glasses commonly appear more or less translucent, depending on the thickness of the surface crystalline layer.

This translucent appearance of the surface-crystallized glasses is undesirable for many products. Rather, such products need more strongly clouded, white opaque glasses.

A stronger, opaque appearance can be achieved by increasing the crystalline layer thickness. However, this procedure has the disadvantage that, with thin glass specimens, the tensile stress in the interior of the glass increases quickly, and the compressive stress in the crystalline surface layer decreases.

According to one preferred form of the invention, lithium-alum in osilicate basic glasses which are clouded by calcium phosphate and/or barium phosphate are able to form crystalline surface layers by the process of this invention, and, as a result, to build up a compressive stress in the surface layer. Table IV indicates generically the composition range of a class of such white, opaque glasses.

Table IV

| Component | Wt %* | Component | Wt %* |
|---|---|---|---|
| $SiO_2$ | about 52 to 70% | MgO | about 0 – 5% |
| $Al_2O_3$ | " 10 – 20% | ZnO | " 0 – 3% |
| $B_2O_3$ | " 0 – 8% | CaO | " 0 – 10% |
| $P_2O_5$ | " 2 – 10% | BaO | " 0 – 12% |
| $Li_2O$ | " 1 – 4% | $TiO_2$ | " 0 – 1.2% |
| $Na_2O$ | " 0 – 8% | $ZrO_2$ | " 0 – 2.5% |

Table IV-continued

| Component | Wt %* | Component | Wt %* |
| --- | --- | --- | --- |
| $K_2O$ | " | 0 – 10% | |

*100 weight percent total basis.

In any given glass having a composition as defined in Table IV, the weight ratio of $Li_2O/Al_2O_3$ is not greater than about 0.3, the sum of $TiO_2$ plus $ZrO_2$ is not to exceed about 2.5 weight %, the sum of $Na_2O$ plus $K_2O$ is in the range from about 1 to 10 weight %, the sum of CaO plus BaO is at least about 2 weight %, and the sum of MgO plus ZnO is at most about 5 weight %.

Optionally, about 0.5 to 1 weight % of $As_2O_3$ can be added to a given composition as a refining agent. Examples of white and opaque glasses which have an increased mechanical strength by surface crystallization in accordance with the process of this invention and their characteristic properties, are included in Tables IIb and IIIb.

In addition to the clouding agents $P_2O_5$, CaO and BaO, the $Al_2O_3$ content and alkali content also each have an effect on the clouding. So as to achieve an adequate degree of clouding, the $P_2O_5$ content must be at least about 2 weight % and the CaO content must be at least about 1 weight %, or the BaO content must be greater than about 5%, in a given composition.

The content of $Al_2O_3$ can be the higher in proportion as more clouding agents (calcium phosphate and/or barium phosphate) and $Na_2O$ and/or $K_2O$ are contained in a starting basic glass. Above about 20 weight % of $Al_2O_3$ in a given composition a sufficient clouding is no longer obtained. Although the $Na_2O$ by themselves do not produce any phosphate clouding, they considerably intensify the clouding effect in association with the CaO and/or BaO. Hence, in the presence of $Na_2O$, clouding effects can still be produced above about 12 weight % of $Al_2O_3$ in a given glass.

By contrast with the clear basic glasses, the ZnO content in a given cloudy glass must not exceed about 3 % by weight with the basic glasses which are clouded by calcium phosphate and/or barium phosphate, since otherwise individual internal crystals are characteristically developed with the heat treatment for the surface crystallization, as with a too high $TiO_2$ content and/or $ZrO_2$ content in the glass interior, and this, are already described, may lead to a disruptive effect in or from the interior of the glass. In the presence of more that about 1 weight % of MgO, the ZnO content should preferably not exceed about 2 weight % in a given glass.

Also in an opaque glass, the $P_2O_5$ apparently causes formation of strongly rounded crystal points, or smooth crystal fronts, respectively.

For the development of a crystalline surface layer in accordance with the process of this invention, a starting glass body is heated to a temperature at which the surface crystals have a growth speed of about 100 μm/h. Since generally a crystalline layer with a thickness of about 100 μm is sufficient to resist any abrasion, such as occurs in normal use, the glass body is tempered for about 1 hour at this temperature. This crystallization temperature, at which the crystals have a growth speed of about 100 μm, lies at about 100°C to 300°C above the transformation temperature with the starting glasses of the composition range as shown in Table I.

In order to reduce deformation in a product glass body, the starting glass body is heated as quickly as possible by reaction or by rapid heating from the transformation temperature to the crystallization, temperature, since the growing crystalline surface layer counteracts the deformation, and, with thick glass objects, the interior of the glass initially still has a sufficiently high viscosity. The danger that, in this case, only relatively few, strongly pronounced crystals are formed, which show zones of high tensile stress around their cyrstal points, does not exist if such a starting glass contains more than about 1 % of $P_2O_5$.

Another heat treatment for the surface crystallization involves accelerating the surface crystallization and avoiding any deformation. Thus, the starting glass bodies, e.g., glass sheets, are drawn through a vertically disposed gradient furnace, in which the upper furnace temperature lies in the region of the upper devitrification limit of the glass to be crystallized. The speed of transit can be so adjusted with this procedure that the desired thickness of the crystalline surface layer is obtained.

A process is described in British Pat. No. 1,089,911, in which surface-crystallizing glass is coated with a nucleus-forming agent, for which silver or titanium dioxide is used. By these nucleus formers, the nucleus formation on and in the surface is accelerated, so that the crystallization can be started sooner. No modification of the crystal growth speed is achieved by the nucleus formers. Both nucleus formers remain in or on the surface layer even after the surface crystallization, whereby the appearance of the glass surface is changed, at least when $TiO_2$ is used.

In accordance with a preferred form of the present invention, a starting glass with a composition range as indicated (Table I) forms at temperatures between the Tg (Tg designates transformation range at a viscosity of about $10^{13.5}$ poises) and 100°C above Tg (in which case such glass has a viscosity of about $5 \cdot 10^{11}$ poises), and in times ranging from a few minutes up to about 1 hour, crystalline surface layers with a thickness of a few μm (microns), if its surface is covered during this tempering with a lithium-containing substance (hereinafter referred to generally as "lithium pickle"). A lithium pickle is comprised of an inorganic lithium salt such as, for example, lithium sulphate, lithium aluminae (presently preferred), lithium titanate, lithium zirconate, or lithium silicate, or the like, and is applied over the surface of a glass body to be heat treated in accordance with the teaching of the present invention, prior to the commencement of such heat treatment. The lithium containing substance is conveniently formulated into a water or organic liquid based paste and is applied to the glass body so as to produce a coating thereof after drying to remove volatiles from the paste composition as hereinafter indicated, a coating layer which ranges in thickness from about 2 to about 5 mm, though thinner and thicker coatings may be employed. The treatment of the surface crystallizing glasses with a lithium salt pickle has the advantage over the known treatment with pure nucleus formers, such as $TiO_2$, Ag, and the like, in that the lithium salt acts both as a nucleus former (and as a result makes possible an eariler starting of the surface crystallization) and also increases the crystal growth speed in a surface layer which is a few μm thick by alithium exchange.

With the composition ranges which are claimed herein, the lithium exchange in the surface layer takes place solely until a closed crystalline surface layer has been developed. Thereafter, the presence of the pickle is of no signficance for the continued growth of the crystals.

The great importance of the lithium aluminate pickle is due to the fact that it is possible or a closed crystalline surface layer which is a few $\mu$m thick to be produced at such low temperatures and in such short times that no substantial deformation of the glass bodies occurs. The importance of such pickle is also based on the knowledge that a crystal layer which is a few $\mu$m thick, but is closed, imparts to the glass body thereunder such a stability that it is scarcely still able to be deformed, even with a subsequent raising of the temperature.

In accordance with this knowledge, it is expedient to carry out a two-stage heat treatment in order to avoid a deformation of certain types of glass bodies, such as hollow bodies. For this purpose, a glass body is initially enclosed or coated by dipping or spraying with a substance containing lithium aluminate, which substance is initially dried between 100° and 150°C. The glass body covered with the pickle is then heated to a pre-crystallization temperature, at which the glass body has a viscosity of approximately $5 \cdot 10^{11}$ poises, and is tempered at this temperature for such a long time (about 1 hour) that a closed crystalline surface layer with a thickness of a few $\mu$to forms on its surface. Thereafter, the glass body is either cooled, and the pickle removed by washing, and the glass objects then heated to the crystallization temperature, or such is brought directly with the pickle to the crystallization temperature. At the crystallization temperature, the crystals have a growth speed of about 100 $\mu$m/h. The heating-up speed between the pre-crystallization and crystallization temperatures is in this case no longer decisive.

By the application of prior art compounds which either only assist the nucleus formation, as for example $TiO_2$, or only increase the lithium concentration in the surface layer, as for example $Li_2SO_4$, deformation usually can only be reduced, but not completely avoided.

The lithium aluminate pickle can be removed again if desired after a tempering without any residue forming on the glass surface.

The glass bodies treated with lithium aluminate pickle can also be directly heated to a crystallization temperature, or drawn through a vertically disposed gradient furnace, in which case it is possible to demonstrate an unexpected improvement as compared with untreated glass objects as regards deformation.

In general the present invention is directed to a process for making a high strength glass body. The process includes heating a preformed glass body at temperatures in the range from about the transition temperature of the glass comprising said body up to the upper devitrification limiting temperature of said glass for a time sufficient to permit crystals selected from the group consisting of B-spodumene, h-quartz and mixtures thereof to form on the surface of such body, such crystals have incorporated thereinto a higher weight percentage of lithium on a 100 weight percent total glass composition weight basis than was present in said glass initially. The additional quantity of such lithium in such crystals is obtained by internal lithium ion exchange of ions selected from the group consisting of sodium and potassium from interior portions of said glass body (unless the starting glass body is first coated with a lithium pickle as herein above described in which event the lithium is derived from the pickle until the crystalline surface layer is continuous about the body and reaches a few microns in thickness), the heating being conducted without said body coming into contact with an external source of lithium ions. The starting glass on a 100 weight percent total composition basis is as described in Table I above. After such heating, the resulting so-heated body is cooled.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLES 1–27

A series of glasses are prepared suitable for use as starting materials in the practice of the invention. In each instance, the glass is prepared from a mixture of components as detailed in Table II, (a) and (b) below. The corresponding mixtures of initial materials are calculated from the percentages by weight of the respective different oxides. Each starting mixture is then blended and charged into a zirconia-silica crucible, and is heated to 1,500°C, and is kept at this temperature for 6 hours. Each resulting glass is cast into sheets of 150 × 80 × 20 mm. The sheets are allowed to cool down to room temperature. Each resulting glass sheet is suitable for use in the practice of this invention. Each such glass sheet is processed with internal ion exchange in accord with the invention. The procedure is as follows: From the sheets round discs of 45 mm diameter and 1.5 mm thickness are cut which are heated to 50°C above Tg, and are held at this temperature for 1 hour. Thereafter, the discs are heated to the DtA peak temperature as indicated in tables IIIa and IIIb. They are then cooled to room temperature. The discs are abraded with emery (grain 180) under a pressure of 1 kg for 10 minutes. Thereafter, the discs are laid onto a ring of 40 mm diameter and loaded in the centre. The load is slowly increased at 2 kg/min. until the discs break.

EXAMPLE 28

Round discs with a diameter of 45 mm and a thickness of 1.5 mm are made from the glass 11 in Table IIa. Each disc is tempered for 1 hour at 650°C, thereafter heated at 2°/min to 780°C, and once again tempered for 1 hour at this latter temperature. With this heat treatment, a crystalline surface layer with a thickness of 100 $\mu$m is found to be formed. The strength of the round discs is found to average about 4,500 kp/cm$^2$ (after abrasion). The round discs have a translucent apperance.

EXAMPLE 29

Square rods of the dimensions 2 ×5 ×100 mm of the glass 7 (Table IIa) are ground and polished. One rod is dipped into a paste consisting of lithium aluminate, second rod into a paste consisting of lithium sulphate, a third rod into a paste consisting of titanium dixoide. Thereafter each resulting rod is dried at about 100°–200°C for 30 minutes. The rods so treated with paste and an untreated control rod are then laid on two knife-edges with a spacing about 80 mm therebetween and are subjected to the following defined heat treatment:

Rapid heating up to 660°C — heat treatment for 1 hour at 660°C — continued heating at 2°/min up to 790°C —to heat treatment for 20 minutes at 790°C —to cooling at 3°/min. After the heat treatment, the rods are freed from the paste by washing and the flexures of the rods are measured. The results are set out in Table V below. Each rod has a crystalline surface layer with a thickness of about 100 μm.

Table V

| Rod Ex.No. | Paste | Flexure under natural loading |
|---|---|---|
| I. | Lithium aluminate | 0.2 mm |
| II. | Lithium sulphate | 5.0 mm |
| III. | Titanium dioxide | 2.7 mm |
| IV. | without pickle | 22.0 mm |

Both the raising of the crystal growth speed in the surface layer by $Li_2SO_4$ and the acceleration of the nucleus formation by $TiO_2$ greatly reduce the flexure, but without completely excluding the latter, such as is obtained by the lithium aluminate. In the same manner as the two lithium pastes, the titanium paste can also be removed after the heat treatment without any residues.

EXAMPLE 30

A square rod with the dimensions 2 ×5 ×100 mm of glass 7 is treated in accordance with Example 29 with a lithium aluminate paste, laid together with an untreated rod on two knife-edges spaced at 80 mm from one another and heat-treated for 1 hour at 660°C. After this precrystallization, the lithium aluminate paste is removed, the rod is once again laid on the two knife-edges, both rods are heated at 2°/min up to 790°C, heat-treated at this temperature for 1 hour and thereafter cooled at 3°/min.

The rod treated with lithium aluminate shows a flexure of less than 0.2 mm, while the untreated rod shows a flexure of 21 mm (flexure as far as the support). After the pre-crystallization, the rod treated with lithium aluminate has a closed crystalline layer with a thickness of 5 μm, which is thus sufficient for preventing any flexure with further raising of the temperature, as is shown by a comparison with Example II (Table V), with which the pickle remained on the rod throughout the entire heat treatment. After the pre-crystallization, the untreated rod only has individual crystals which are a few μm thick.

EXAMPLE 31

A plate with the dimensions of 2 ×50 ×100 mm and ground and polished on both sides is produced from the glass (Table IIa). For forming a crystalline surface layer, the plate or sheet is drawn at a constant speed of 10 cm/min through a vertically disposed gradient furnace having a length of 120 cm. The gradient furnace has a starting temperature of 200°C and a final temperature of 920°C. The cooling is effected in a cooling oven. The entire crystallization is already completed after 12 minutes. The thickness of the crystalline surface layer is 100 μm. It is not possible with the optical microscope to find any crystal points projecting into the glass interior. The crystal front shows a smooth surface.

EXAMPLE 32

A 1-litre jar is blown from the glass 17 (Table IIa) and treated in accordance with Example 29 with the lithium aluminate paste. For the surface crystallization, the treated jar is heat-treated for 1 hour at 610°C, heated up to 720°C at 2°/min and once again heat-treated for 1 hour at 720°C. After the heat treatment, the jar is cooled at 3°/min and the lithium aluminate paste is cleaned off the jar. The jar has a lustrous, white and opaque appearance.

TABLE II a)

| Glass | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $SiO_2$ | 54.50 | 63.50 | 64.00 | 62.00 | 62.00 | 63.30 | 63.60 | 60.70 | 60.10 | 62.00 | 65.80 | 60.00 | 60.00 | 60.00 | 60.00 |
| $Al_2O_3$ | 22.00 | 16.30 | 15.00 | 25.00 | 20.00 | 21.70 | 21.90 | 20.90 | 20.70 | 21.50 | 18.00 | 20.60 | 20.00 | 20.00 | 20.00 |
| $B_2O_3$ | 1.10 | — | — | — | 5.00 | — | — | — | — | — | — | — | — | — | — |
| $P_2O_5$ | 7.40 | — | 2.00 | — | — | — | — | 4.50 | 4.50 | — | — | — | — | 0.50 | — |
| $Li_2O$ | 2.00 | 2.00 | 3.00 | 3.20 | 3.50 | 2.90 | 3.30 | 3.10 | 3.10 | 1.50 | 4.00 | 3.10 | 3.50 | 3.00 | 3.50 |
| $Na_2O$ | 1.00 | 4.10 | 4.00 | 2.00 | 2.00 | — | 4.10 | 3.90 | 3.90 | 4.00 | 2.00 | 7.70 | — | — | 4.00 |
| $K_2O$ | — | — | — | — | — | 3.10 | — | — | — | — | — | — | 10.00 | 8.00 | — |
| MgO | 4.50 | 0.90 | 1.00 | 1.00 | 1.00 | 0.90 | 1.00 | 0.90 | 0.90 | 1.00 | 1.00 | 0.80 | 0.50 | — | 0.50 |
| ZnO | 3.00 | 6.10 | 2.00 | 6.00 | 5.00 | 6.10 | 2.10 | 2.00 | — | 6.00 | 6.00 | 5.80 | 4.00 | 2.00 | 4.00 |
| CaO | 4.50 | 0.50 | 5.00 | 0.90 | 1.00 | 0.50 | 2.10 | 2.00 | 4.90 | 4.00 | 0.50 | 0.50 | 2.00 | 2.00 | 8.00 |
| BaO | — | 1.60 | 4.00 | — | 0.50 | 1.50 | 2.10 | 2.00 | 1.90 | — | 1.50 | 1.50 | — | 2.00 | — |
| $TiO_2$ | — | — | — | — | — | — | — | — | — | — | 0.60 | — | — | — | — |
| $ZrO_2$ | — | — | — | — | — | — | — | — | — | — | 0.60 | — | — | 2.50 | — |

TABLE II b)

| Glass | 16 | 17 | 18 | 19 | 20 | 21 | 22 | 23 | 24 | 25 | 26 | 27 |
|---|---|---|---|---|---|---|---|---|---|---|---|---|
| $SiO_2$ | 65.20 | 64.10 | 61.00 | 63.00 | 61.00 | 64.00 | 64.00 | 65.70 | 62.50 | 66.00 | 61.80 | 60.00 |
| $Al_2O_3$ | 10.00 | 15.50 | 20.00 | 15.00 | 15.00 | 15.00 | 15.00 | 15.50 | 16.00 | 12.00 | 15.40 | 15.50 |
| $B_2O_3$ | — | — | — | 2.00 | 6.00 | — | — | — | — | — | — | — |
| $P_2O_5$ | 5.00 | 4.90 | 5.00 | 5.00 | 5.00 | 3.00 | 6.00 | 5.00 | 4.00 | 5.00 | 4.80 | 5.00 |
| $Li_2O$ | 2.80 | 3.90 | 3.00 | 3.50 | 3.50 | 3.00 | 4.00 | 2.10 | 3.50 | 3.50 | 4.00 | 3.00 |
| $Na_2O$ | 4.00 | 4.00 | 6.00 | 4.00 | 4.00 | 4.00 | 4.00 | 4.10 | — | 2.50 | 2.00 | 4.00 |
| $K_2O$ | | | | | | | | | 8.00 | | | |
| MgO | 4.00 | 1.00 | — | 1.00 | 1.00 | 1.00 | — | 0.90 | — | 1.50 | — | 1.00 |
| ZnO | — | — | — | 2.00 | — | 2.00 | 3.00 | — | 2.00 | 2.00 | — | 2.00 |
| CaO | 5.00 | 5.10 | 5.00 | 2.50 | 2.50 | 5.00 | 2.50 | 5.20 | 2.00 | 5.00 | — | 5.00 |
| BaO | 4.00 | 1.50 | — | 2.00 | 2.50 | 3.00 | 1.50 | 1.50 | 2.00 | 3.00 | 12.00 | 2.00 |
| $ZrO_2$ | — | — | — | — | — | — | — | — | — | — | — | 2.50 |

TABLE III a)

| Properties | Glass | 1 | 2 | 3 | 4 | 5 | 6 | 7 |
|---|---|---|---|---|---|---|---|---|
| Linear coefficient of thermal expansion $\alpha \cdot 10^7$ (20–300°C)/°C | | 46.7 | 47.5 | 52.8 | 45.0 | 48.6 | 45.0 | 58.4 |
| Transformation point in °C ($\eta \sim 10^{13.3}$p) | | 636 | 628 | 550 | 671 | 581 | 655 | 612 |
| Density (g/cc) | | 2.510 | 2.494 | 2.526 | 2.507 | 2.457 | 2.502 | 2.480 |
| Processing point in °C ($\eta - 10^4$ P) | | 1213 | 1343 | 1180 | 1272 | 1199 | 1283 | 1269 |
| Length of glass ($V_A - T_g$) $\Delta T$ in °C | | 577 | 715 | 630 | 601 | 618 | 633 | 657 |
| Position of the DTA peak in °C | | 817 | 840 | 744 | 870 | 765 | 870 | 769 |
| Deformation tendency (DTA-$T_g$) $\Delta T$ in °C | | 181 | 212 | 194 | 199 | 174 | 215 | 157 |

| Properties | Glass | 8 | 9 | 10 | 11 | 12 | 13 | 14 | 15 |
|---|---|---|---|---|---|---|---|---|---|
| Linear coefficient of thermal expansion $\alpha \cdot 10^7$ (20–300°C) °C | | 58.8 | 62.8 | 49.6 | 50.8 | 69.2 | 62.6 | 62.4 | 58.7 |
| Transformation point in °C ($\eta$ $10^{13.3}$p) | | 611 | 648 | 662 | 600 | 564 | 572 | 613 | 599 |
| Density (g/cc.) | | 2.467 | 2.470 | 2.529 | 2.507 | 2.534 | 2.461 | 2.503 | 2.529 |
| Processing point in °C ($\eta - 10^4$ P) | | 1289 | 1220 | 1266 | 1261 | 1202 | 1254 | 1296 | 1169 |
| Length of glass ($V_A - T_g$) $\Delta T$ in °C | | 678 | 572 | 604 | 661 | 638 | 692 | 683 | 570 |
| Position of the DTA peak in °C | | 803 | 892 | 971 | 757 | 744 | 695 | 833 | 750 |
| Deformation tendency (DTA-$T_g$) $\Delta T$ in °C | | 192 | 244 | 309 | 153 | 180 | 123 | 220 | 151 |

| Properties | Glass | 1 | 2 | 3 | 4 | 5 | 6 | 7 |
|---|---|---|---|---|---|---|---|---|
| Upper devitrification limit (UDL) in °C | | 1119 | 1140 | 1078 | 1267 | 1168 | 1250 | 1140 |
| Devitrification behaviour ($V_A$ − UDL) $\Delta T$ in °C | | +94 | +203 | +102 | +5 | +31 | +38 | +129 |
| Resistance to flexural tension (Kp/cm²) | | 3750 | 4500 | 5300 | 2650 | 3000 | 5000 | 6000 |
| Appearance after the surface crystallization | | * | * | * | * | * | * | * |

| Properties | Glass | 8 | 9 | 10 | 11 | 12 | 13 | 14 | 15 |
|---|---|---|---|---|---|---|---|---|---|
| Upper devitrification limit (UDL) in °C | | 1170 | 1150 | 1120 | 1253 | 1030 | 1026 | 1153 | 1144 |
| Devitrification behaviour ($V_A$ − UDL) $\Delta T$ in °C | | +119 | +70 | +146 | +8 | +172 | +229 | +146 | +25 |
| Resistance to flexural tension (Kp/cm²) | | 6400 | 6500 | 4000 | 4500 | 3750 | 6800 | 4200 | 3900 |
| Appearance after the surface crystallization | | * | * | * | * | * | * | * | * |

*Translucent

TABLE III b)

| Properties | Glass No. | 16 | 17 | 18 | 19 | 20 | 21 |
|---|---|---|---|---|---|---|---|
| Linear heat expansion coefficient $\alpha \cdot 10^7$ (20 – 300°C) °C | | 65.9 | 67.2 | 69.4 | 63.3 | 63.3 | 63.4 |
| Transformation point Tg in °C ($\eta$ $10^{13.3}$ p) | | 550 | 560 | 630 | 567 | 548 | 548 |
| Density g/cc | | 2.505 | 2.456 | 2.431 | 2.422 | 2.402 | 2.504 |
| Processing point in °C ($\eta$ $10^4$ P) | | 1161 | 1206 | 1248 | 1203 | 1168 | 1189 |
| Length of glass ($V_A - T_g$) $\Delta T$ in °C | | 611 | 646 | 618 | 636 | 620 | 641 |
| Position of the DTA peak in °C | | 741 | 720 | 943 | 717 | 787 | 760 |
| Deformation tendency (DTA-Tg) $\Delta T$ in °C | | 191 | 160 | 313 | 150 | 239 | 212 |

| Properties | Glass No. | 22 | 23 | 24 | 25 | 26 | 27 |
|---|---|---|---|---|---|---|---|
| Linear heat expansion coefficient $\alpha \cdot 10^7$ (20 – 300°C) °C | | 62.0 | 58.7 | 65.3 | 60.2 | 61.4 | 63.3 |
| Transformation point Tg in °C ($\eta$ $10^{13.3}$ p) | | 568 | 664 | 621 | 574 | 608 | 622 |
| Density g/cc | | 2.460 | 2.427 | 2.438 | 2.483 | 2.554 | 2.537 |
| Processing point in °C ($\eta$ $10^4$ P) | | 1224 | 1316 | 1281 | 1238 | 1233 | 1210 |
| Length of glass ($V_A - T_g$) $\Delta T$ in °C | | 656 | 652 | 660 | 664 | 625 | 588 |
| Position of the DTA peak in °C | | 759 | 997 | 900 | 732 | 892 | 832 |
| Deformation tendency (DTA-Tg) $\Delta T$ in °C | | 191 | 333 | 279 | 158 | 284 | 210 |

| Properties | Glass No. | 16 | 17 | 18 | 19 | 20 | 21 |
|---|---|---|---|---|---|---|---|
| Upper devitrification limit in °C | | 1059 | 1120 | 1125 | 1111 | 1051 | 1094 |
| Devitrification behaviour ($V_A$ − UDL) $\Delta T$ in °C | | +102 | +74 | +123 | +92 | +117 | +95 |
| Resistance to flexural tension or bending strength (Kp/cm²) | | 1700 | 4100 | 1600 | 4050 | 1800 | 4800 |
| Appearance after surface crystallization | | ** | ** | ** | ** | ** | ** |

| Properties | Glass No. | 22 | 23 | 24 | 25 | 26 | 27 |
|---|---|---|---|---|---|---|---|
| Upper devitrification limit in °C | | 1173 | 1060 | 1134 | 1154 | 1133 | 1120 |
| Devitrification behaviour ($V_A$ − UDL) $\Delta T$ in °C | | +51 | +256 | +147 | +84 | +100 | +90 |
| Resistance to flexural tension or bending strength (Kp/cm²) | | 1600 | 2450 | 3000 | 3000 | 2800 | 3300 |

TABLE IIIb)-continued

| Properties | Glass No. | 22 | 23 | 24 | 25 | 26 | 27 |
|---|---|---|---|---|---|---|---|
| Appearance after surface crystallization | | ** | ** | ** | ** | ** | ** |

** White Opaque

What is claimed is:

1. A process for making a high strength glass body comprising the steps of:

A. heating a preformed glass body at temperatures in the range from the transition temperature of the glass comprising said body up to the upper devitrification limiting temperature of said glass for a time sufficient to permit crystals selected from the group consisting of B-spodumene, h-quartz and mixtures thereof to form on the surface of such body, said crystals having incorporated thereinto a higher weight percentage of lithium (100 weight percent total weight basis) than was present in said glass initially, at least a portion of the additional quantity of such lithium in said crystals being obtained by internal lithium ion exchange of ions selected from the group consisting of sodium and potassium from interior portions of said glass body, said heating being conducted in the absence of an external source of molten alkali metal ions, said glass comprising on a 100 weight percent total composition basis:

```
from   [about]   52 to   70%    by weight of   SiO2
       ["]       10 to   25%         "         Al2O3
       ["]        0 to    8%         "         B2O3
       ["]        0 to   10%         "         P2O5
       ["]        1 to    4%         "         Li2O
       ["]        0 to    8%         "         Na2O
       ["]        0 to   10%         "         K2O
       ["]        0 to    5%         "         MgO
       ["]        0 to    7%         "         ZnO
       ["]        0 to   10%         "         CaO
       ["]        0 to   12%         "         BaO
       ["]        0 to    1.2%       "         TiO2
       ["]        0 to    2.5%       "         ZrO2
``` wherein the weight ratio of $Li_2O/Al_2O_3$ is not greater than 0.3, the sum of the respective weight percentages of $TiO_2$ plus $ZrO_2$ is not above 2.5 wt %, and the sum of the respective weight percentages of $Na_2O$ plus $K_2O$ is the range from 1 to 10 wt %, and B. cooling the resulting so-heated body.

2. The process of claim 1 wherein said glass additionally contains from about 0.5 to 1 weight percent $As_2O_3$ on a 100 weight percent total composition basis.

3. The process of claim 1 wherein said glass additionally contains up to about 10 weight percent of at least one coloring oxide.

4. The process of claim 1 wherein said heating is conducted using temperatures in the range from said transition temperature of said glass up to the upper devitrification limiting temperature above said transition temperature.

5. The process of claim 4 wherein said glass body is drawn upwardly through a vertically disposed gradient furnace wherein the upper temperature lies in the region of said upper devitrification limiting temperature and the speed of transit of said body in said furnace is such as to produce in said body a surface crystallization thickness of predetermined value.

6. The process of claim 1 wherein said heating is concluded using temperatures in the range from about said transition temperature of said glass up to a temperature about 300°C above said transition temperature.

7. The process of claim 6 wherein the heating of the glass body is performed quickly from said transition temperature to a crystallization temperature at which said crystals have a growth speed of about 100 microns per hour, and said glass body is kept at said crystallization temperature for a time sufficient to produce a closed crystalline surface layer on said body.

8. The process of claim 6 wherein the heating of the glass body is performed at a temperature from said transition temperature to 50° to 100°C above said transition temperature and said glass body is kept at said temperature for a time sufficient to produce a closed crystalline surface layer of a few microns on said body and the temperature then raised to a crystallization temperature at which said crystals have a growth speed of about 100 microns per hour, and said glass body is kept at said crystallization temperature for a time sufficient to produce a closed crystalline surface layer on said body.

9. The process of claim 1 wherein said glass is initially clear and transparent and also has a $P_2O_5$ content of less than about 2 weight percent on a 100 weight percent total composition basis.

10. The process of claim 1 wherein said glass is initially clear and transparent and also has a CaO content of less than about 1 weight percent and a BaO content of less than about 5 weight percent on a 100 weight percent total composition basis.

11. The process of claim 1 wherein said glass is initially clear and transparent and also has an $Al_2O_3$ content of more than about 20 weight percent on a 100 weight percent total composition basis.

12. The process of claim 1 wherein said glass comprises on a 100 weight percent total composition basis:

```
from   [about]   52 to 70%    by weight of   SiO2
 "     ["]       10 to 20%         "         Al2O3
 "     ["]        0 to  8%         "         B2O3
 "     ["]        2 to 10%         "         P2O5
 "     ["]        1 to  4%         "         Li2O
 "     ["]        0 to  8%         "         Na2O
 "     ["]        0 to 10%         "         K2O
 "     ["]        0 to  5%         "         MgO
 "     ["]        0 to  3%         "         ZnO
 "     ["]        0 to 10%         "         CaO
 "     ["]        0 to 12%         "         BaO
 "     ["]        0 to  1.2%       "         TiO2
 "     ["]        0 to  2.5%       "         ZrO2
``` provided that in any given composition the ratio of $Li_2O/Al_2O_2$ is not more than 0.3, the sum of $TiO_2$ plus $ZrO_2$ is not more than 2.5 weight percent, the content of $Na_2O$ plus $K_2O$ is in the range from 1 to 10 weight percent, the sum of CaO plus BaO is at least 2 weight percent, the sum of MgO plus ZnO is not more than 5 weight percent.

13. The process of claim 1 wherein said body before said heating is coated with a thin dry coating of lithium containing substance.

14. The process of claim 13 wherein said lithium containing substance comprises a member of the group consisting of lithium aluminate, lithium sulphate, lithium titanate, lithium zirconate, or lithium silicate.

15. The process of claim 14 wherein said lithium containing substance comprises lithium aluminate.

16. The process of claim 13 wherein after being so coated with said lithium containing substance said body is first heated to between about 100 to 150°C to dry such coating.

17. A glass body having at least a partially crystalline surface layer of crystals selected from the group consisting of B-spodumene, h-quartz and mixtures thereof, said crystals having incorporated therewith a higher weight percentage of lithium and a lower percentage of other alkali metal oxide on a 100 weight percent total composition basis than was initially present in the glass comprising said body, at least a portion of such additional quantity of such lithium in said crystals having been obtained by internal lithium ion exchange of ions selected from the group consisting of sodium and potassium from interior portions of said glass body, said glass comprising initially on a 100 weight percent total composition basis:

| from | [about] | | | by weight of | |
|------|---------|---|---|--------------|---|
| from | [about] | 52 to 70 | % | by weight of | $SiO_2$ |
| "    | ["]     | 10 to 25 | % | "            | $Al_2O_3$ |
| "    | ["]     | 0 to 8   | % | "            | $B_2O_3$ |
| "    | ["]     | 0 to 10  | % | "            | $P_2O_5$ |
| "    | ["]     | 1 to 4   | % | "            | $Li_2O$ |
| "    | ["]     | 0 to 8   | % | "            | $Na_2O$ |
| "    | ["]     | 0 to 10  | % | "            | $K_2O$ |
| "    | ["]     | 0 to 5   | % | "            | $MgO$ |
| "    | ["]     | 0 to 7   | % | "            | $ZnO$ |
| "    | ["]     | 0 to 10  | % | "            | $CaO$ |
| "    | ["]     | 0 to 12  | % | "            | $BaO$ |
| "    | ["]     | 0 to 1,2 | % | "            | $TiO_2$ |
| "    | ["]     | 0 to 2,5 | % | "            | $ZrO_2$ | wherein the weight ratio of $Li_2O/Al_2O_3$ is not greater than 0.3, the sum of the respective weight percentages of $TiO_2$ plus $ZrO_2$ is not above 2,5 weight%, and the sum of the respective weight percentages of $Na_2O$ plus $K_2O$ is in the range from 1 to 10 weight%.

* * * * *